US00RE49071E

(19) United States
(12) Reissued Patent
Brekke et al.

(10) Patent Number: US RE49,071 E
(45) **Date of Reissued Patent: *May 17, 2022**

(54) GOLF CLUB

(71) Applicant: SUMITOMO RUBBER INDUSTRIES, LTD., Kobe (JP)

(72) Inventors: Dustin J. Brekke, Fountain Valley, CA (US); Jeff D. Brunski, Los Angeles, CA (US); Matthew R. Daraskavich, Huntington Beach, CA (US); Samuel G. Lacey, Huntington Beach, CA (US); Nathaniel J. Radcliffe, Huntington Beach, CA (US); Brian D. Schielke, Huntington Beach, CA (US)

(73) Assignee: SUMITOMO RUBBER INDUSTRIES, LTD., Kobe (JP)

( * ) Notice: This patent is subject to a terminal disclaimer.

(21) Appl. No.: 16/546,406

(22) Filed: Aug. 21, 2019

Related U.S. Patent Documents

Reissue of:
(64) Patent No.: 9,737,769
Issued: Aug. 22, 2017
Appl. No.: 14/597,574
Filed: Jan. 15, 2015

U.S. Applications:
(63) Continuation of application No. 16/545,314, filed on Aug. 20, 2019, now Pat. No. Re. 48,217, which is an
(Continued)

(51) Int. Cl.
*A63B 53/04* (2015.01)
*A63B 60/42* (2015.01)
(Continued)

(52) U.S. Cl.
CPC ..... *A63B 53/0466* (2013.01); *A63B 60/42* (2015.10); *G01B 5/0023* (2013.01); *A63B 53/00* (2013.01); *A63B 2225/02* (2013.01)

(58) Field of Classification Search
CPC ..... A63B 53/0466
See application file for complete search history.

(56) References Cited

U.S. PATENT DOCUMENTS 5,608,160 A * 3/1997 Chastonay ..... A63B 60/42 473/292
5,776,008 A * 7/1998 Lundberg ..... A63B 53/10 273/DIG. 23
(Continued)

FOREIGN PATENT DOCUMENTS

GB 2425262 A * 10/2006 ..... A63B 53/0466

OTHER PUBLICATIONS

Golfweek: True Temper's 'sub-40' driver shaft, Project X PXv 39 (Year: 2013).*
(Continued)

*Primary Examiner* — David O Reip
(74) *Attorney, Agent, or Firm* — Oliff PLC

(57) ABSTRACT

A golf club includes a club head having a volume of greater than about 360 $cm^3$ and a mass less than 200 g. A shaft attachable to the club head has a tip end, a butt end, and a shaft balance point distance, $BP_s$, as measured from the butt end, of no more than 19 inches. And the golf club has a mass less than 300 g.

18 Claims, 21 Drawing Sheets

Related U.S. Application Data application for the reissue of Pat. No. 9,737,769, which is a continuation of application No. 13/541,432, filed on Jul. 3, 2012, now Pat. No. 8,951,142, which is a continuation of application No. 12/711,771, filed on Feb. 24, 2010, now Pat. No. 8,241,139.

(51) Int. Cl.
*G01B 5/00* (2006.01)
*A63B 53/00* (2015.01)

(56) References Cited

U.S. PATENT DOCUMENTS 5,879,241 A * 3/1999 Cook ..... A63B 53/00 473/289
6,520,867 B1 * 2/2003 Miura ..... A63B 60/54 473/316
6,607,452 B2 * 8/2003 Helmstetter ..... A63B 53/02 473/345
6,767,422 B1 * 7/2004 Atsumi ..... A63B 53/10 156/184
7,326,125 B2 * 2/2008 Moriyama ..... A63B 53/00 473/292
8,066,583 B2 * 11/2011 Rice ..... A63B 53/10 473/282
2002/0187853 A1 * 12/2002 Beach ..... A63B 53/0466 473/345
2005/0215351 A1 * 9/2005 Hasegawa ..... A63B 53/0466 473/345
2006/0009302 A1 * 1/2006 Oyama ..... A63B 53/0466 473/282
2007/0004528 A1 * 1/2007 Hocknell ..... A63B 53/0466 473/287
2007/0298902 A1 * 12/2007 Hasegawa ..... A63B 60/42 473/319
2010/0041492 A1 * 2/2010 Rice ..... A63B 53/00 473/289

OTHER PUBLICATIONS

Tourspec Golf: Fujikura ZERO Speeder—The lightest golf shaft in the world! (Year: 2016).*
MCA Golf (Mitsubishi Chemical): Grand Bassara Series. (Year: 2017).*
May 25, 2016 Office Action issued in U.S. Appl. No. 14/597,574.
Oct. 31, 2016 Office Action issued in U.S. Appl. No. 14/597,574.

* cited by examiner

GOLF CLUB

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO PRIOR APPLICATIONS

This application is a continuation of U.S. patent application Ser. No. 13/541,432, filed on Jul. 3, 2012, which is in turn a continuation of U.S. patent application Ser. No. 12/711,771, filed on Feb. 24, 2010 and issued as U.S. Pat. No. 8,241,139 on Aug. 14, 2012, the disclosures of which are incorporated herein by reference.

COPYRIGHT AUTHORIZATION

The disclosure below may be subject to copyright protection. The copyright owner has no objection to the facsimile reproduction by anyone of the documents containing this disclosure, as they appear in the Patent and Trademark Office records, but otherwise reserves all applicable copyrights.

BACKGROUND

It is generally known to those skilled in the art of golf club making that the travel distance of a struck golf ball is related to the club-head speed (swing speed) generated at ball impact. Attempting to increase the swing speed by simply making the club longer may negatively affect shot accuracy and ball-travel distance. Alternatively, to increase swing speed, some manufacturers have produced golf clubs having a diminished overall weight. However, these clubs generally have lighter shafts that communicate a vague feel to the player, leading to inconsistent shots and a loss of confidence in the equipment.

SUMMARY

The present invention, in one or more aspects thereof, may advantageously comprise a golf club that delivers increased swing speed, augmented forgiveness on off-center shots, improved ball-launch conditions, a solid feel, and greater ball-travel distance.

In one example, a golf club, according to one or more aspects of the present invention, may have a total club mass less than about 300 g, a swing weight between D0 and D6, a club-head mass less than about 200 g, a club-head volume of at least about 360 $cm^3$, a grip mass less than about 50 g, and a shaft having a tip end, a butt end, and a shaft balance point located no more than 24 inches from the butt end.

In another example, a golf club, according to one or more aspects of the present invention, may include a total club mass less than about 300 g; a club-head mass less than about 200 g; a club-head volume greater than about 360 $cm^3$; a shaft having a tip end, a butt end, a shaft balance point located no more than 24 inches from the tip end, and a torsional displacement angle greater than about 5.5°; and an imaginary coordinate system having an origin coincident with the center of gravity of the club head, the coordinate system having an x-axis, a y-axis, and a z-axis, wherein the club head has a moment of inertia about the z-axis of at least about 4500 $g{\cdot}cm^2$.

In another example, a golf club, according to one or more aspects of the present invention, may include a total club mass less than about 300 g; a club length greater than about 45 inches; a club head having a front portion, a top portion, a bottom portion, a mass less than about 200 g, and a volume of at least about 360 $cm^3$; a club balance point located no more than 35 inches from the butt portion of the grip, wherein a ratio of the distance between the club balance-point and the butt portion of the grip to the club length is greater than 0.76; and a shaft having a tip end, a butt end, a shaft length greater than about 44 inches, and a shaft balance point located no more than 24 inches from the butt end, wherein a ratio of the distance between the shaft balance point and the butt end to the shaft length is less than 0.47.

In yet another example, a golf club, according to one or more aspects of the present invention, may include a total club mass less than about 300 g; a swing weight between D0 and about D6; a club head having a volume greater than about 360 $cm^3$, a face bulge between about 12.5 inches and about 16 inches, and a mass less than about 200 g; a shaft having a tip end, a butt end, a shaft balance point located no more than 24 inches from the tip end, and a mass less than about 55 g; a grip having a mass less than about 40 g; and an imaginary coordinate system having an origin coincident with the center of gravity of the club head, the coordinate system having an x-axis, a y-axis, and a z-axis, wherein the head has a moment of inertia about the z-axis of at least about 4500 $g{\cdot}cm^2$.

In yet another example, a golf club, according to one or more aspects of the present invention, may include a total club mass less than 300 g; a swing weight between D0 and about D6; a club length greater than about 45 inches; a club head having a face center, a sweet spot, a volume greater than about 360 $cm^3$, and a mass less than about 200 g, wherein the sweet spot is substantially coincident with the face center; a shaft having a mass less than about 50 g; a grip having a mass less than about 40 g; and an imaginary coordinate system having an origin coincident with the center of gravity of the club head, the coordinate system having an x-axis, a y-axis, and a z-axis, wherein the club head has a moment of inertia about the z-axis of at least about 4500 $g{\cdot}cm^2$ and a moment of inertia about the y-axis of at least about 3000 $g{\cdot}cm^2$.

In yet another example, a golf club, according to one or more aspects of the present invention, may include a total club mass less than about 300 g; a club length greater than about 45 inches; a club head having a face center, a sweet spot, a volume greater than about 360 $cm^3$, a face bulge between about 12.5 inches and about 16 inches, and a mass less than about 200 g, wherein the sweet spot is substantially coincident with the face center; a shaft having a tip end, a butt end, a shaft balance point located no more than 24 inches from the butt end, and a torsional displacement angle greater than about 5.5°; a grip having a mass less than about 40 g; and an imaginary coordinate system having an origin coincident with the center of gravity of the club head, the coordinate system having an x-axis, a y-axis, and a z-axis, wherein the head has a moment of inertia about the z-axis of at least about 4500 $g{\cdot}cm^2$.

In yet another example, a golf club, according to one or more aspects of the present invention, may include a total club mass less than about 300 g; a swing weight between D0 and D6; a club length greater than about 45 inches; a club head having a tip end, a butt end, a shaft balance point located no more than 24 inches from the butt end, and a mass less than about 50 g; a grip having a mass less than about 40 g; and an imaginary coordinate system having an origin coincident with the center of gravity of the club head, the coordinate system having an x-axis, a y-axis, and a z-axis, wherein the club head has a moment of inertia about the z-axis of at least about 4500 $g \cdot cm^2$ and a moment of inertia about the y-axis of at least about 3000 $g \cdot cm^2$.

These and other features and advantages of the golf club according to the invention in its various aspects, as provided by one or more of the examples described in detail below, will become apparent after consideration of the ensuing description, the accompanying drawings, and the appended claims. The accompanying drawings are for illustrative purposes only and are not intended to limit the scope of the present invention.

BRIEF DESCRIPTION OF THE DRAWINGS

Exemplary implementations of the present invention will now be described with reference to the accompanying drawings, wherein.

DETAILED DESCRIPTION

For clarity, the definitions used herein are interpreted with reference to one or more aspects of the invention characterized in relation to FIGS. 1-23 of the drawings. However, those skilled in the art will appreciate that such definitions also apply to same or similar aspects of the invention described throughout the specification in connection with the remaining drawing figures.

Figure 1:
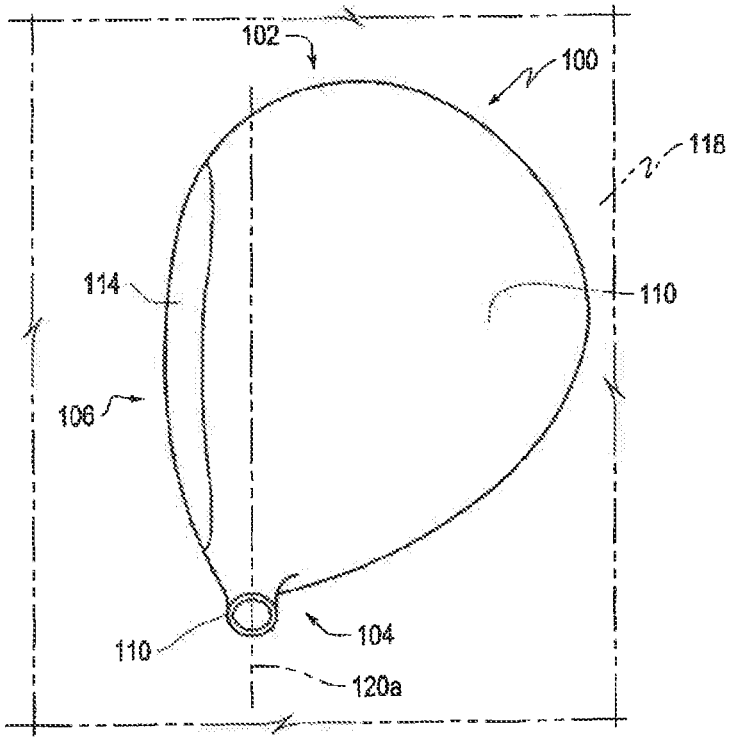
FIG. 1 is a top plan view of an exemplary golf club head according to one or more aspects of the present invention.
Figure 2:
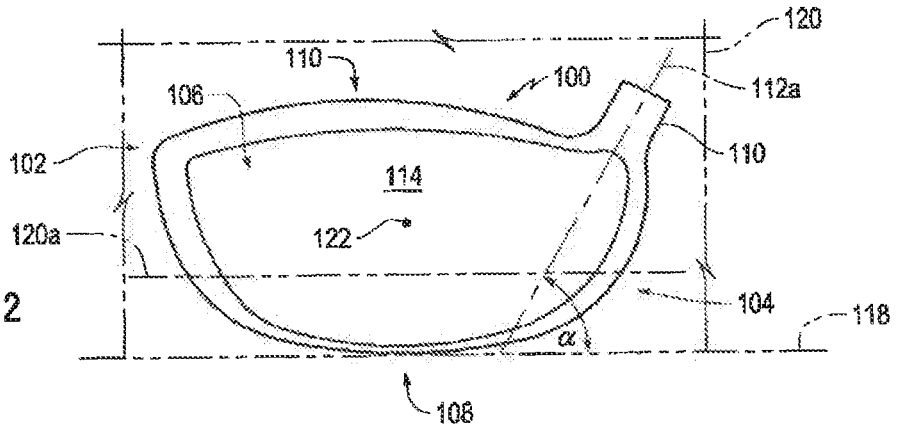
FIG. 2 is a front elevational view of the golf club head of FIG. 1.

As illustrated in FIGS. 1 and 2, a club head 100 may comprise a toe 102, a heel 104, a front portion 106, a bottom portion 108, a top portion 110, and a hosel 112, having a central axis or centerline 112a.

Figure 3:
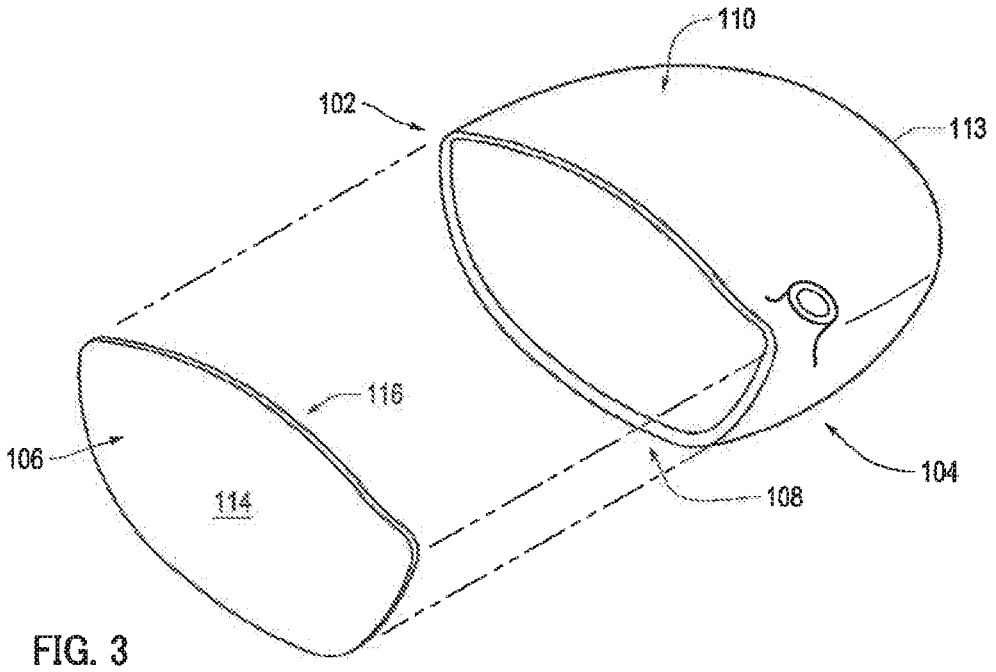
FIG. 3 is an exploded perspective view of the golf club head of FIG. 1.

Referring to FIGS. 1 and 3, "front portion", e.g., the front portion 106, as used herein, denotes a portion of a golf club head at least partially delimited by a generally planar front surface 114, suitable for striking a golf ball, and a rear surface 116. Those skilled in the art will appreciate that even though the front surface 114 is referred to as generally planar, in one or more aspects of the invention it may possess parameters of bulge and roll, customary in a wood-type club. Alternatively, the front surface 114 may be essentially flat, as in an iron-type club.

Referring to FIGS. 1 and 2, "reference position", as used herein, denotes a position of the club head where the hosel centerline 112a is oriented at a lie angle $\alpha$ of 60° with respect to a horizontal ground plane 118 and lies in an imaginary vertical hosel plane 120, which contains an imaginary horizontal line 120a, generally parallel to the front surface 114. Unless otherwise indicated, all parameters herein are specified with the club head in the reference position.

Figure 4:
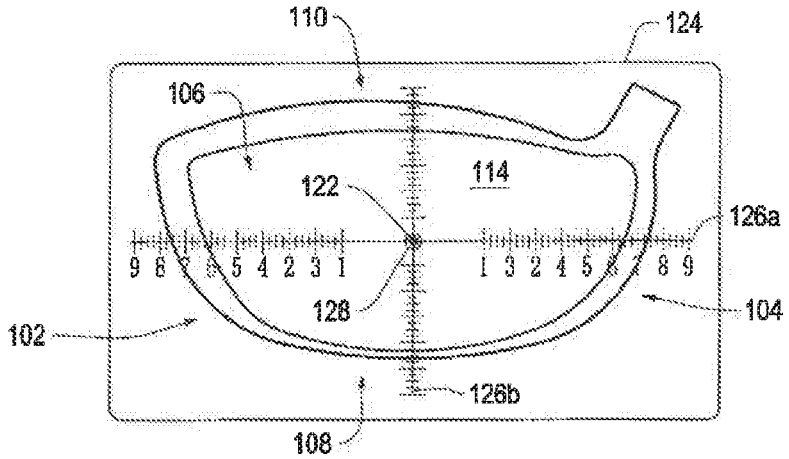
FIG. 4 is a front elevational view of the golf club head of FIG. 1, wherein a template is applied to the front portion of the golf club head.

Referring to FIGS. 2 and 4, "face center", e.g., a face center 122, as used herein, is located using a template 124, having a coordinate system with a heel-toe axis 126a orthogonal to a top-bottom axis 126b. An aperture 128 is disposed at the origin of the coordinate system and the axes are graduated into evenly spaced increments. The template 124 may be made of a flexible material, e.g., a transparent polymer.

The location of the face center 122 is determined as follows. The template 124 is initially applied to the front surface 114 so that the aperture 128 is approximately in the middle of the front surface 114 and the heel-toe axis 126a is generally parallel to the line 120a. The template is then translated in the heel-toe direction along the front surface 114 until the heel and the toe measurements along the axis 126a at the opposite edges of the front surface 114 have the same absolute value. Once the template 124 is centered with respect to the front surface 114 in the heel-toe direction, the template is translated in the top-bottom direction along the front surface until the measurements along the axis 126b at the opposite edges of the front surface 114 have the same absolute value. The above sequence is repeated until the absolute value of the heel measurement along axis 126a is equal to that of the toe measurement and the absolute value of the bottom measurement along axis 126b is equal to that of the top measurement. A point is then marked on the front surface through the aperture 128 to designate the face center 122.

A locating template, such as the template 124, is referenced in the United States Golf Association's Procedure for Measuring the Flexibility of a Golf Clubhead (Revision 2.0, Mar. 25, 2005) and is available from the USGA.

Figure 5:
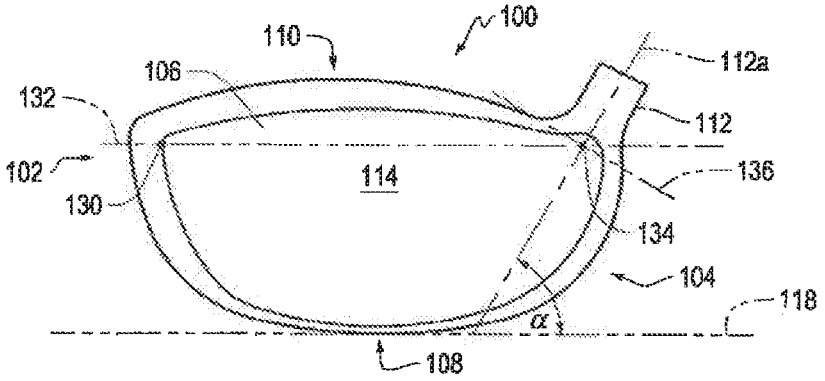
FIG. 5 is a front elevational view of the golf club head of FIG. 1.

Referring to FIG. 5, "front toe point", e.g., an outer toe point 130, as used herein, denotes the furthest laterally projecting point of the front surface 114 proximate the toe 102. An imaginary horizontal plane 132, passing through the outer toe point 130, will intersect the hosel centerline 112a at the point 134. "Hosel", e.g., the hosel 112, as used herein, denotes a portion of the club head delimited from the rest of the head by an imaginary plane 136, normal to the hosel centerline 112a and containing the point 134.

Referring to FIG. 1, "top portion", e.g., the top portion 110, as used herein, denotes the portion of the club head, excluding the front portion 106 and the hosel 112, visible in a top plan view with the club head in the reference position.

Figure 6:
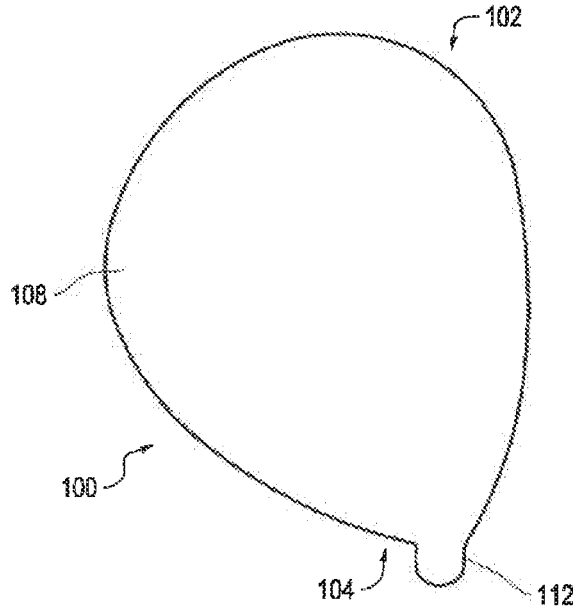
FIG. 6 is a bottom plan view of the golf club head of FIG. 1

Referring to FIG. 6, "bottom portion", e.g., the bottom portion 108, as used herein, denotes the portion of the club head, excluding the hosel 112, visible in a bottom plan view with the club head in the reference position.

Figure 7:
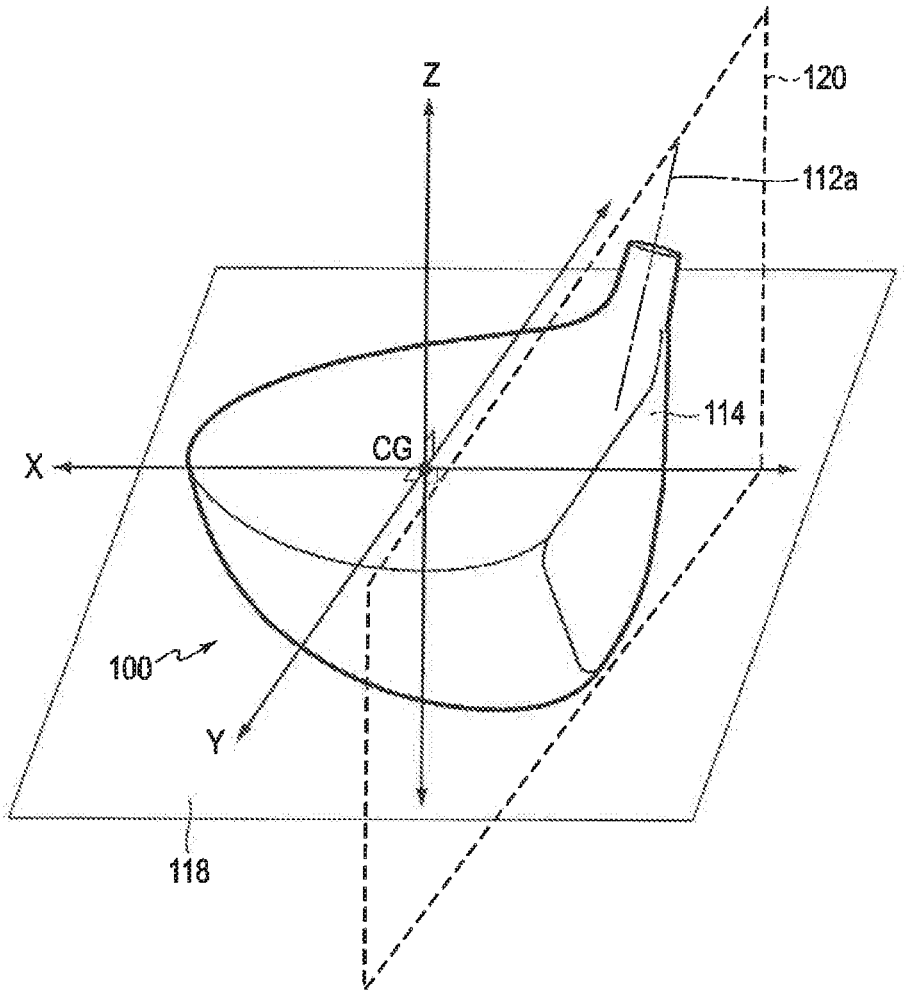
FIG. 7 is a toe-side perspective view of the golf club head of FIG. 1.
Figure 8:
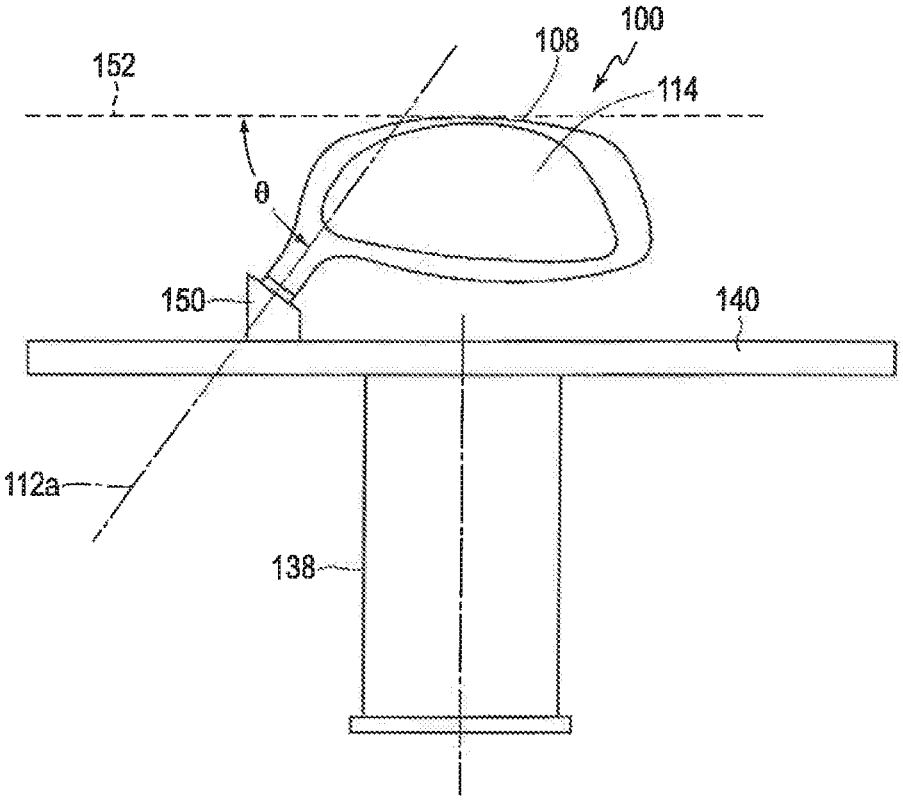
FIG. 8 illustrates an instrument for measuring the primary moment of inertia of the golf-club head of FIG. 1.
Figure 9:
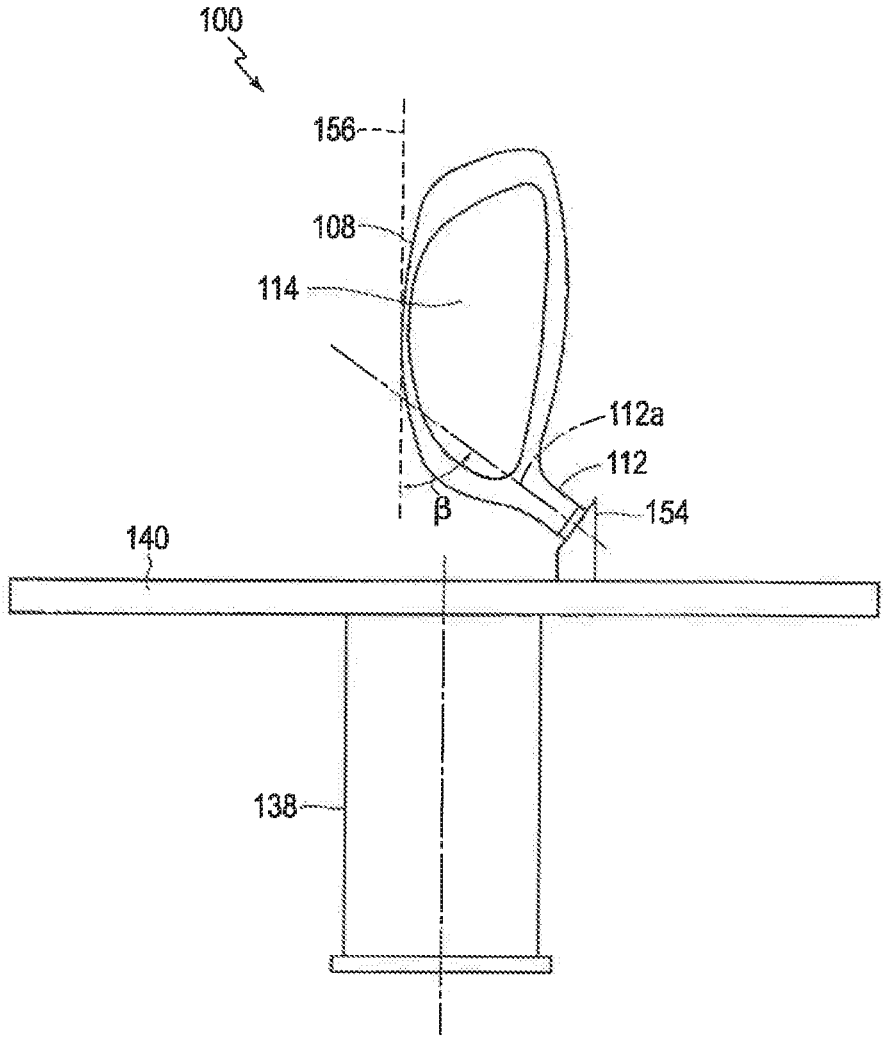
FIG. 9 illustrates an instrument for measuring the secondary moment of inertia of the golf-club head of FIG. 1.

FIG. 7 illustrates an imaginary three-dimensional Cartesian coordinate system, having axes x, y, and z, with its origin at the center of gravity CG of the club head 100, oriented in the reference position. The z-axis is vertical and is parallel to the hosel plane 120, containing the hosel centerline 112a. The y-axis is substantially parallel to the hosel plane 120 and is perpendicular to the z-axis. The x-axis is perpendicular to the z-axis and the y-axis.

The moment of inertia $I_{zz}$ about the z-axis (the primary MOI) and the moment of inertia $I_{yy}$ about the y-axis (the secondary MOI) of the club head 100 may be found using the general methodology disclosed in the Procedure for Measuring the Moment of Inertia of Golf Clubheads, Revision 1.0 (Apr. 12, 2006), as specified by the United States Golf Association (USGA) and R&A Rules Limited (R&A), with procedural modifications for measuring $I_{yy}$ discussed below. The USGA Procedure for Measuring the Moment of Inertia of Golf Clubheads and the associated "USGA MOI Calculation.xls" program are herein incorporated by reference in their entirety.

As described in the USGA Procedure for Measuring the Moment of Inertia of Golf Clubheads, a measuring instrument 138 (see FIGS. 8 and 9), e.g., the Moment of Inertia Instrument (Model #MOI-005-104), available from Inertia Dynamics, Inc. of New Hartford, Conn., designed for measuring the moment of inertia of test parts having mass properties and overall dimensions similar to that of a golf club head, may be used to obtain the moment of inertia $I_{zz}$ about the z-axis and the moment of inertia $I_{yy}$ about the y-axis of the golf club head 100. Referring once again to FIGS. 8 and 9, a horizontal jig plate 140, described in the USGA Procedure for Measuring the Moment of Inertia of Golf Clubheads, is attached to the measuring instrument 138, such that the jig plate and the measurement instrument are level.

Figure 10:
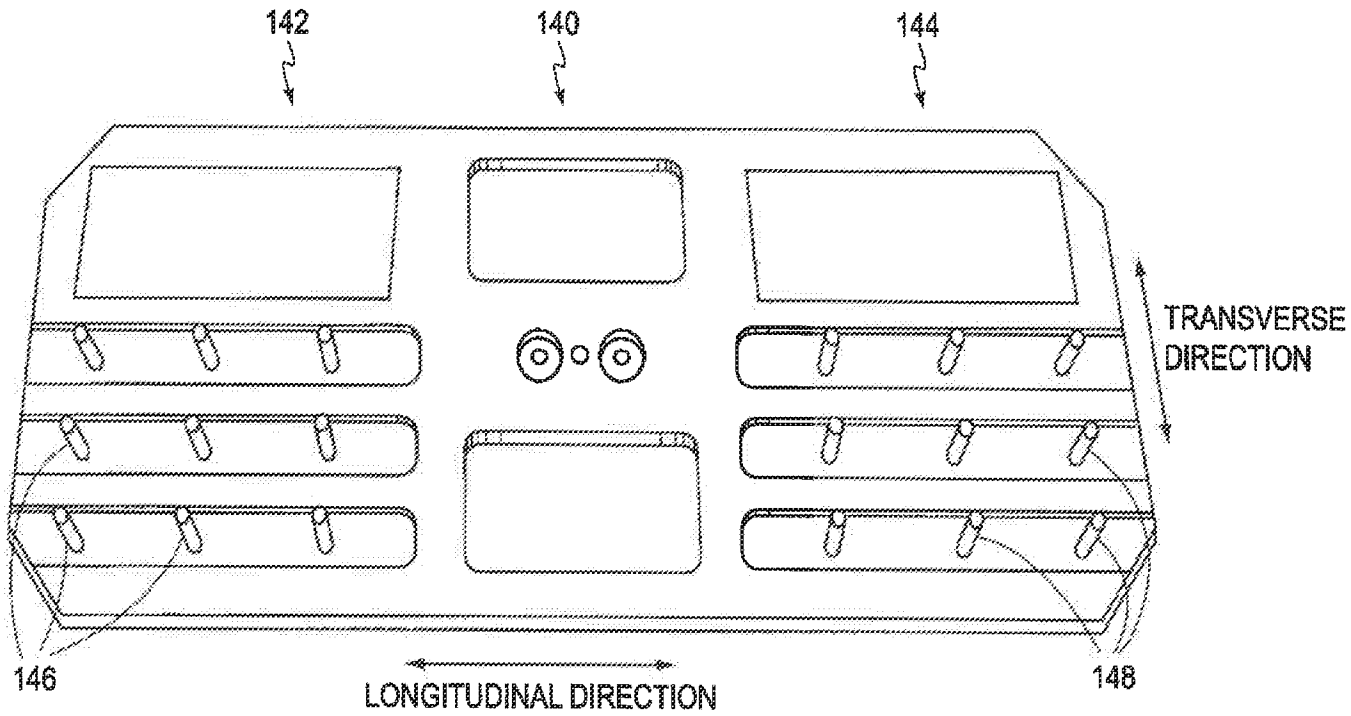
FIG. 10 is a perspective view of a jig plate utilized with the measurement instrument shown in FIGS. 8 and 9.

As shown in FIG. 10, the jig plate 140 has a first side 142 and a second side 144. The first side 142 includes mounting pins 146 and the second side 144 includes mounting pins 148. Pins 146 and 148 comprise rows arranged longitudinally with respect to the jig plate and columns arranged transversely with respect to the jig plate.

For purposes of measuring the primary MOI of the club head 100, an adapter 150 (FIG. 8) is utilized to orient the club head with respect to the jig plate 140 so that the bottom portion 108 of the club head is facing up and the club head 100 is disposed such that the angle θ between the hosel centerline 112a and an imaginary horizontal plane 152 is substantially 60°. Furthermore, the front surface 114 of the club head is substantially parallel to the longitudinal rows of mounting pins 146 and 148. For purposes of measuring the primary MOI of the club head 100, the pins 146 on the first side 142 of the jig plate 140 are used for right-handed club heads and the pins 148 on the second side 144 of the jig plate 140 are used for left-handed club heads.

For purposes of measuring the secondary MOI of the club head 100, an adapter 154 (FIG. 9) is utilized to orient the club head with respect to the jig plate 140 so that the bottom portion 108 of the club head is substantially vertical. In other words, the club head 100 is disposed with respect to the jig plate 140 such that the angle β between the hosel centerline 112a and an imaginary vertical plane 156 is substantially 60°.

Furthermore, as provided in the USGA Procedure for Measuring the Moment of Inertia of Golf Clubheads, the front surface 114 of the club head is substantially parallel to the longitudinal rows of mounting pins 146 and 148. For purposes of measuring the secondary MOI of the club head 100, the pins 146 on the first side 142 of the jig plate 140 are used for left-handed club heads and the pins 148 on the second side 144 of the jig plate 140 are used for right-handed club heads.

Figure 11:
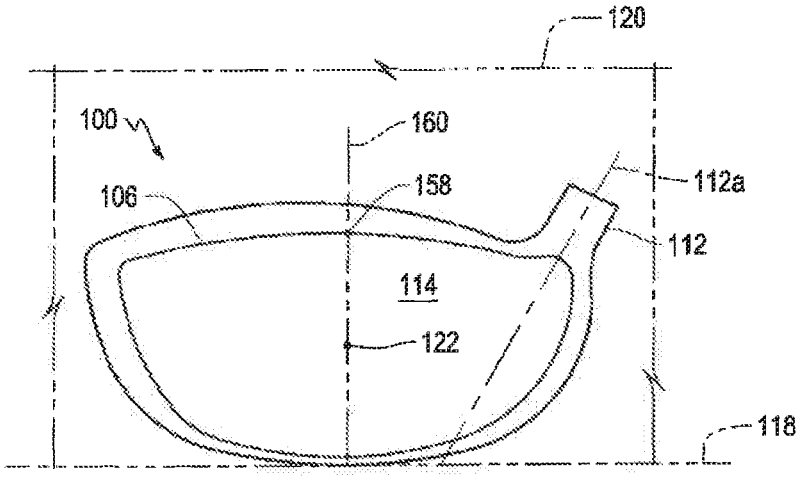
FIG. 11 is a front elevational view of the golf club head of FIG. 1.

Referring to FIG. 11, "center apex", e.g., the center apex 158, as used herein, refers to a point of intersection between an imaginary vertical plane 160 and the top of the front surface 114, with the club head 100 in the reference position. The plane 160 is oriented substantially perpendicular to the hosel plane 120, containing the hosel axis 112a, and passes through the face center 122.

Figure 12:
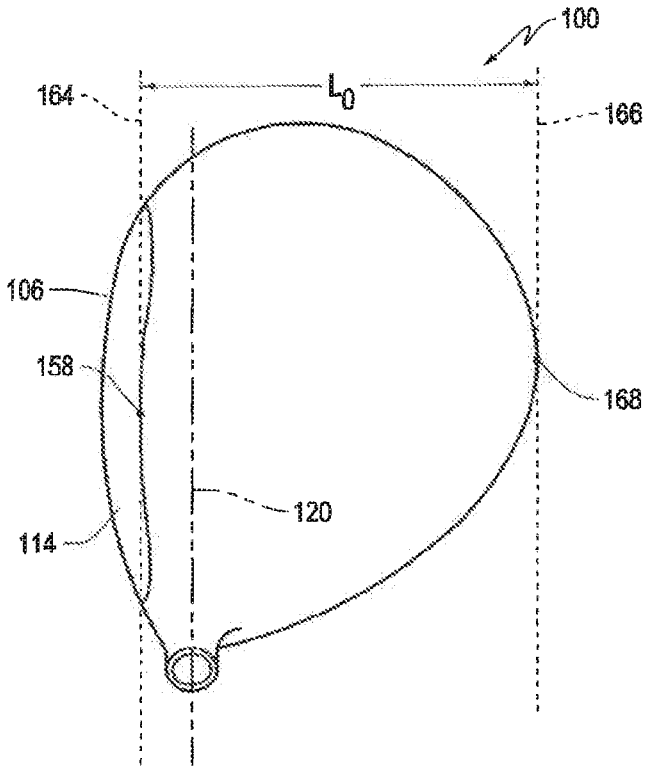
FIG. 12 is a top plan view of the golf club head of FIG. 1.

Referring to FIG. 12, "overall length", e.g., the overall length $L_o$, as used herein, denotes the shortest horizontal distance between a first imaginary vertical plane 164, substantially parallel to the hosel plane 120 and passing through the center apex 158, and a second imaginary vertical plane 166, that is parallel to the plane 164 and passes through the furthest rearwardly projecting point 168 of the club head 100 in the reference position, opposite the front surface 114.

Figure 13:
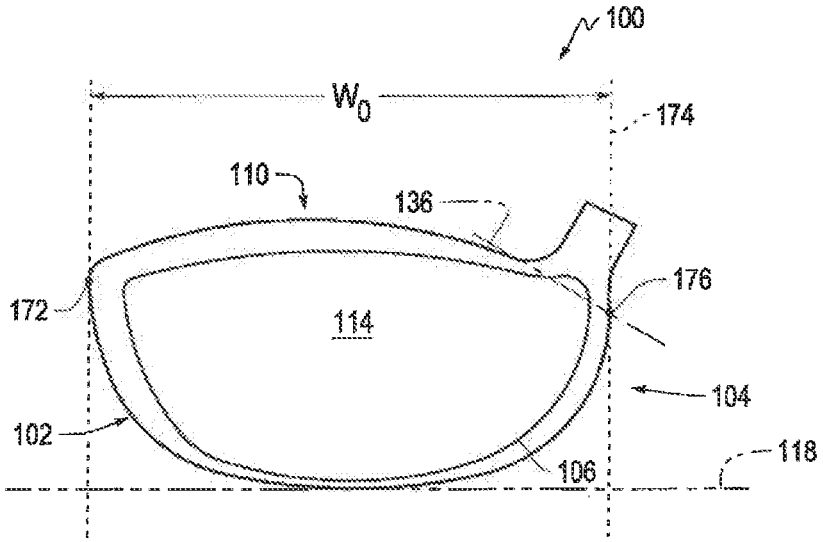
FIG. 13 is a front elevational view of the golf club head of FIG. 1.

Referring to FIG. 13, "overall width", e.g., the overall width $W_o$, as used herein, denotes the shortest horizontal distance between a first imaginary vertical plane 170, substantially perpendicular to the hosel plane 120 (see, e.g., FIG. 11) and passing through the furthest laterally projecting point 172 of the toe 102, and a second imaginary vertical plane 174 that is substantially perpendicular to the hosel plane 120 and passes through the furthest laterally projecting point 176 of the heel 104, lying in the imaginary plane 136, described with reference to FIG. 5 above.

Figure 14:
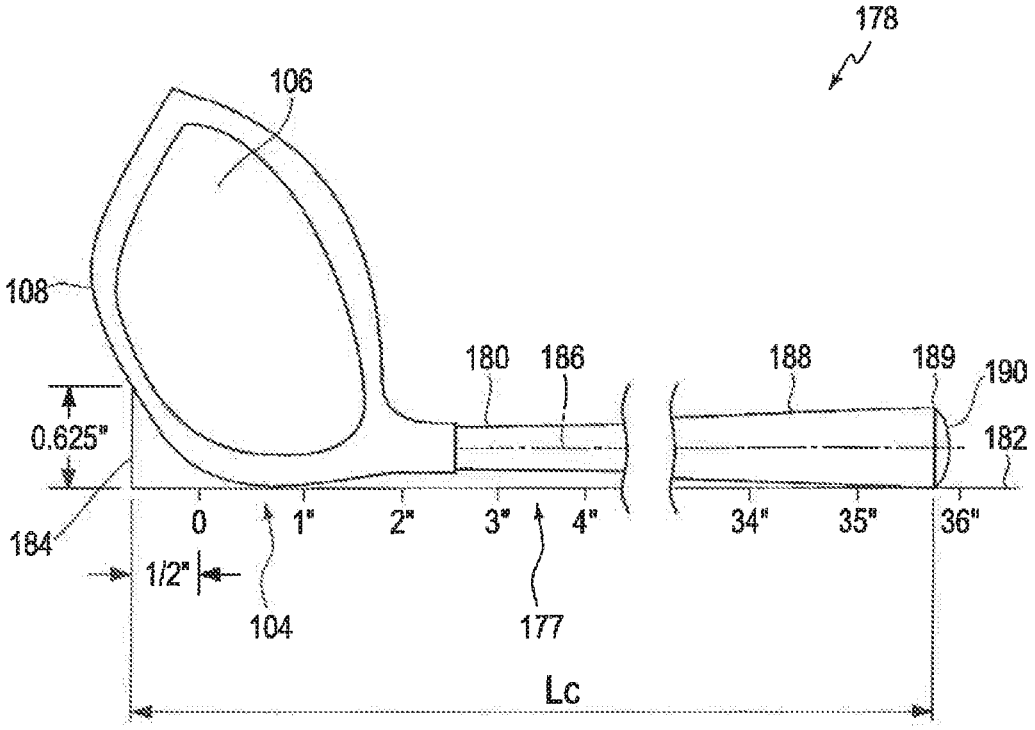
FIG. 14 schematically illustrates a device for measuring the length of an exemplary golf club.

A measurement device 177, schematically illustrated in FIG. 14, is utilized for the purposes of determining the overall length $L_c$ of a golf club 178, having a shaft 180. The measurement device 177 comprises a linear measurement scale 182, graduated, e.g., in inches, and a stop 184, perpendicular thereto. The stop 184 has a height of approximately 0.625 inches relative to the linear measurement scale and is spaced substantially 0.500 inches in the negative direction from the origin of the linear measurement scale.

To measure club length, the golf club 178 is oriented relative to the measurement device 177 so that, when the linear measurement scale 182 is in a horizontal plane, with the stop 184 projecting vertically upward, the heel 104 and the grip 188 of the golf club are resting on the linear measurement scale 182, the face portion 106 of the club head is generally vertically oriented, the bottom portion 108 of the club head rests against the stop 184, and the shaft axis 186 of the golf club is substantially parallel to the linear measurement scale 182. Once the golf club 178 is properly oriented relative to the measurement device 177, the club length is read from the linear scale at the edge 189 of the grip cap. Those skilled in the art will appreciate that the length of the grip dome 190 is not included in the club-length measurement.

Figure 15:
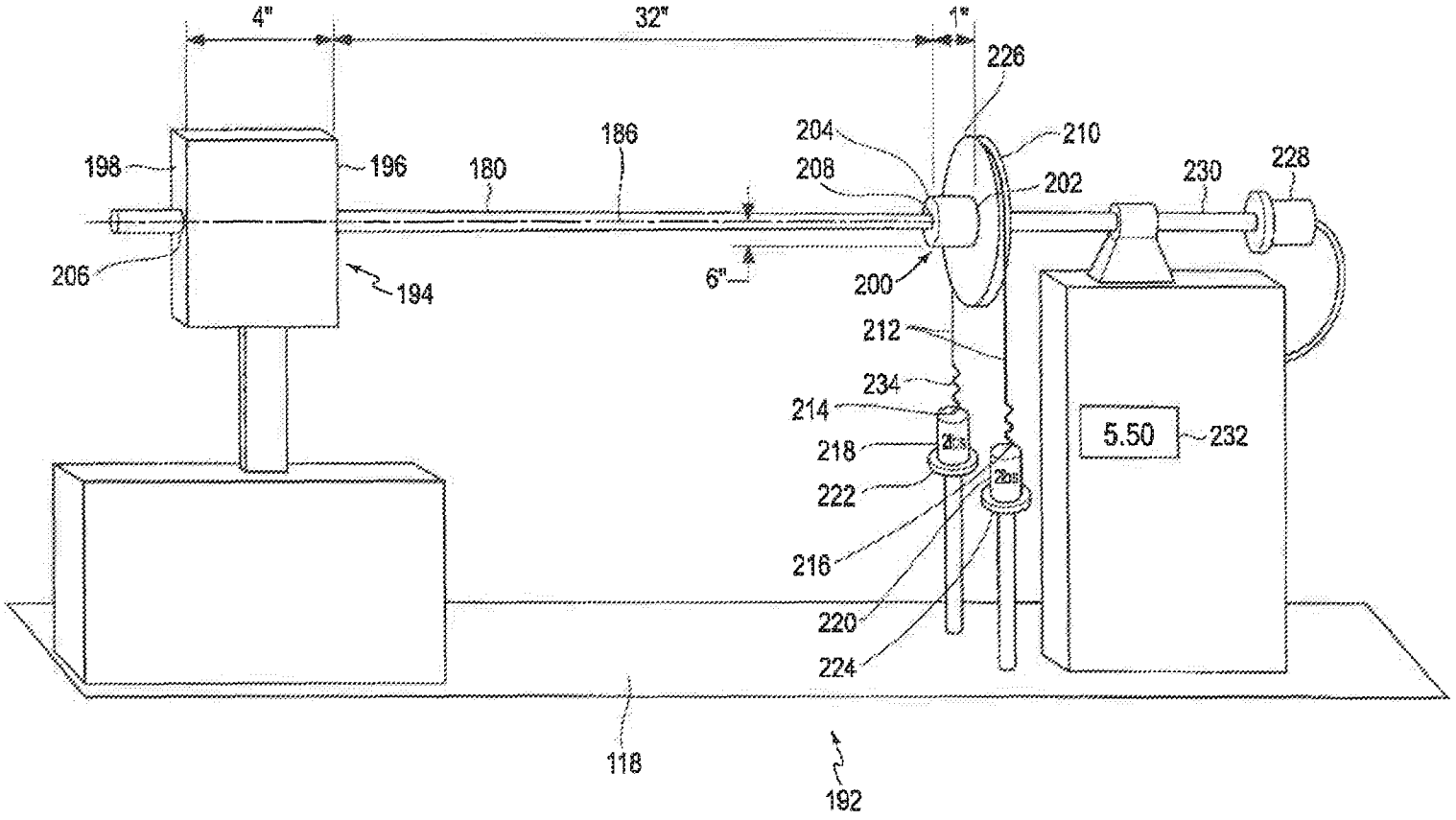
FIG. 15 schematically illustrates an instrument for measuring the torsional displacement angle of an exemplary golf shaft.

A measurement instrument 192, illustrated in FIG. 15, is utilized for the purpose of determining the torsional displacement angle of the golf club shaft 180. The measurement instrument 192 comprises a shaft-butt clamp 194, having a forward surface 196 and a rearward surface 198, laterally spaced a horizontal distance of 4 inches from the forward surface 196, and a tip clamp 200, having a forward surface 202 and a rearward surface 204, laterally spaced a horizontal distance of 1 inch from the forward surface 202. The forward surface 196 of the butt clamp 194 is laterally spaced a horizontal distance of 32 inches from the rearward surface 204 of the tip clamp 200. The butt clamp 194 and the tip clamp 200 include shaft-retaining openings 206 and 208, respectively, coaxial with the shaft axis 186. A torque wheel 210, having a 6 inch (½ ft) radius, is co-axial with the shaft axis 186 and is fixed to the tip clamp 200. The torque wheel has a tether 212 secured to the torque wheel 210 using a locking pin 226. The tether comprises opposing ends 214 and 216, coupled to mass elements 218 and 220, respectively, each weighing 2 lb. The mass elements are disposed on support members, e.g., support members 222 and 224. The opposing ends 214 and 216 of the tether include slack 234 and 236, respectively. The torque wheel 210 pivots an inclinometer 228, e.g., the Accustar® I Inclinometer available from Measurement Specialties, Inc. of Hampton, Va., via a rod 230. The inclinometer is electronically coupled to a readout display 232, e.g., the Infinity® INFS2 Deflection Meter, available from Newport Electronics, Inc. of Santa Ana, Calif.

The shaft tip is inserted a distance of 1 inch into the shaft-retaining opening 208 of the tip clamp 200, such that the shaft tip is retained in the opening 208 in a fixed manner, and the clamp 194 positively engages the butt of the shaft, whereby the shaft axis 186 is substantially parallel to the ground plane 118. To measure the torsional displacement angle of a golf club shaft, the torque wheel 210 is actuated by moving (manually or in an automated manner, e.g., pneumatically) one of the support members away from its respective mass element until slack 234 or 236 at the corresponding end of the tether 212 is taken up completely. A torque of one ft·lb is then applied to the shaft 180 as the torque wheel 210 rotates in either the clockwise or counterclockwise direction, depending on which support member is moved away from its corresponding mass element. The tether 212 includes sufficient slack 234 and 236 at the opposing ends thereof to permit unrestricted angular twisting of the shaft tip relative the butt portion of the shaft when the shaft 180 is subject to a torque of one ft·lb, produced by one of the mass elements acting on the torque wheel 210. The torsional displacement angle measured by the inclinometer 238 is displayed on the readout 232. Preferably, the torsional displacement angle of the shaft is tested in both the clockwise and counterclockwise directions and an average reading is obtained.

Figure 16:
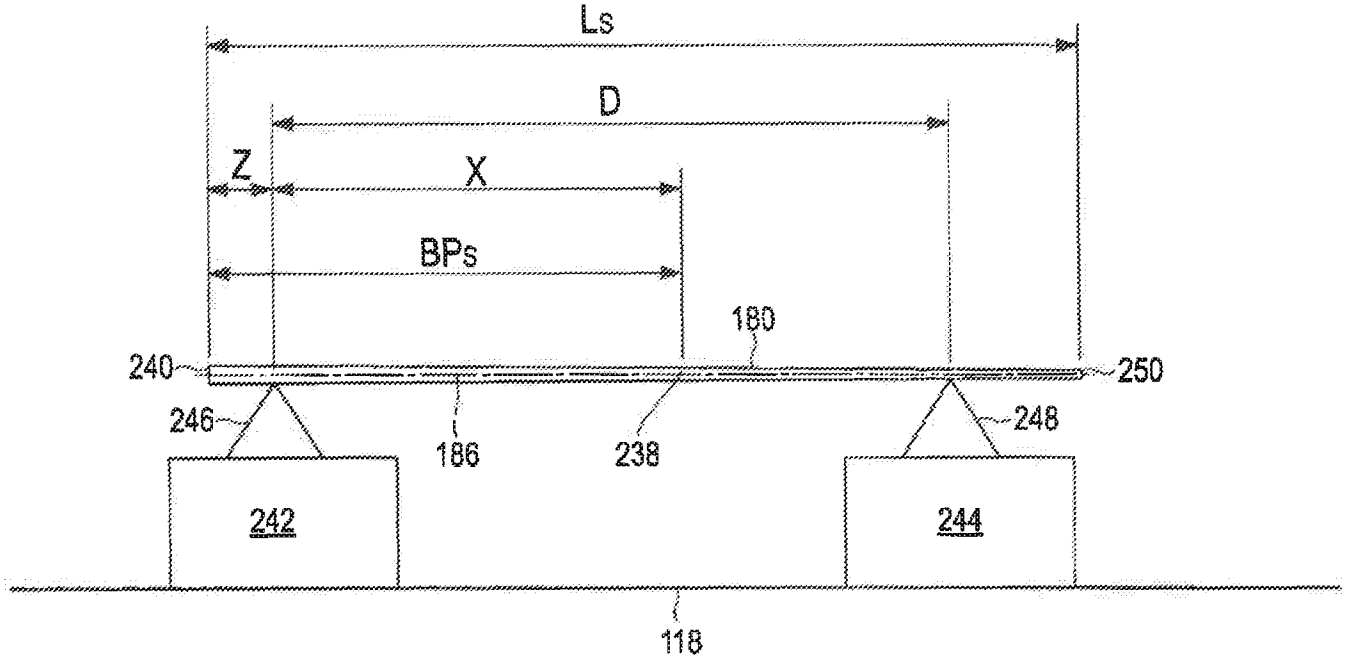
FIG. 16 schematically illustrates a device for locating the balance point of an exemplary golf shaft.

FIG. 16 schematically illustrates a device for locating a balance point 238 of the shaft 180 relative to a butt end 240 of the shaft. The device includes two weight scales 242 and 244 having weight-bearing elements 246 and 248, respectively, oriented such that the shaft axis 186 is substantially horizontal. The shaft 180 is supported by the weight-bearing element 246 an empirically measured horizontal distance Z from the butt end 240 of the shaft, a known horizontal distance D of 30 inches from the weight-bearing element 248, and a horizontal distance X from the shaft balance point 238. Distance X is determined using the equation:

$$X=(M_2/M_{total})D-Z,$$

where $M_2$ corresponds to the mass reading of the weight scale 244 and $M_{total}$ corresponds to the sum of mass readings of both scales 242 and 244. A horizontal distance $BP_s$ between the shaft balance point 238 and the butt end 240 of the shaft 180 is calculated using the following equation:

$$BP_s=Z+X.$$

The horizontal distance between the balance point 238 and a tip end 250 of the shaft 180 is found by subtracting the horizontal distance $BP_s$ from the overall shaft length $L_s$.

Figure 17:
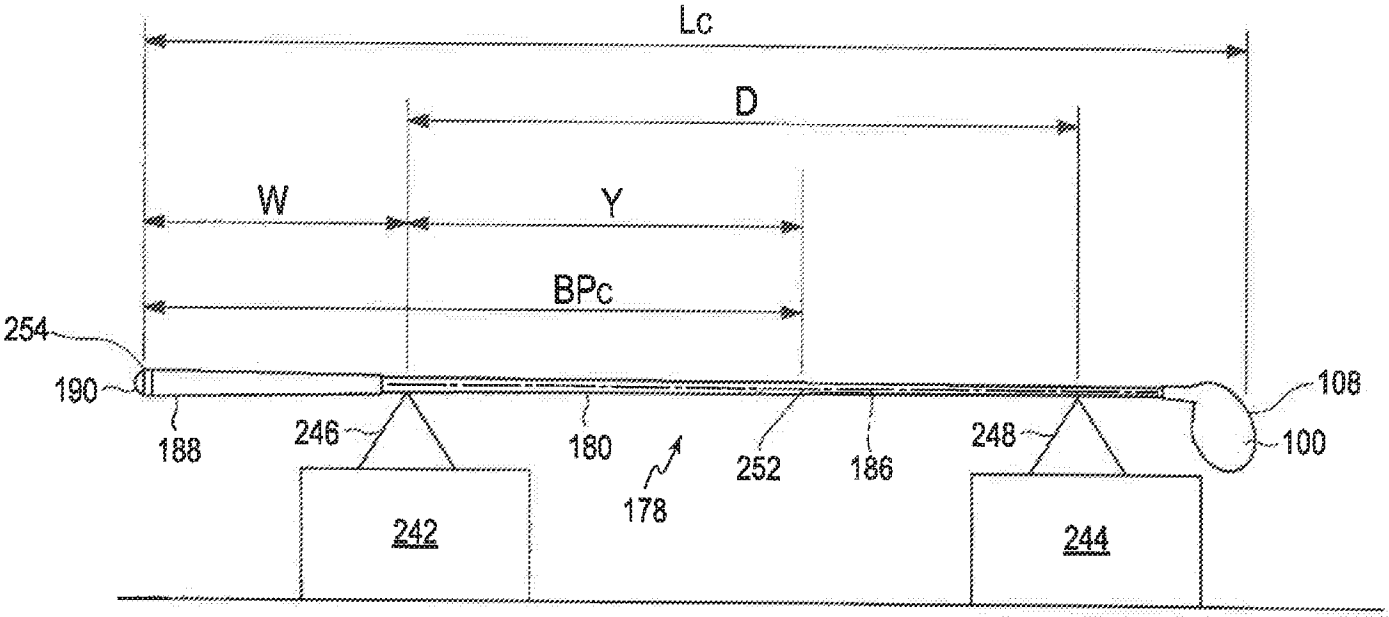
FIG. 17 schematically illustrates a device for locating the balance point of an exemplary golf club.

FIG. 17 schematically illustrates a device for locating a balance point 252 of the club 178 relative to the butt end 254 of the grip 188 of the golf club. The device includes the two weight scales 242 and 244 having the weight-bearing elements 246 and 248, respectively, oriented such that the shaft axis 186 is substantially horizontal. The shaft 180 of the golf club 178 is supported by the weight-bearing element 246 an empirically measured horizontal distance W from the butt portion 254 of the grip 188, a known horizontal distance D of 30 inches from the weight-bearing element 248, and a horizontal distance Y from the club balance point 252. Those skilled in the art will appreciate that the length of the grip dome 190 is not included when measuring the horizontal distance W. Distance Y is obtained using the equation:

$$Y=(M_2/M_{total})D-W,$$

where $M_2$ corresponds to the mass reading of the weight scale 244 and $M_{total}$ corresponds to the sum of mass readings of both scales 242 and 244. A horizontal distance $BP_c$ between the club balance point 252 and the butt end 254 of the grip 188 of the golf club 178 is obtained using the following equation:

$$BP_c=W+Y.$$

The horizontal distance between the club balance point 252 and the bottom portion 108 of the golf club head 100 is determined by subtracting the horizontal distance $BP_c$ from the overall club length $L_c$.

Figure 18:
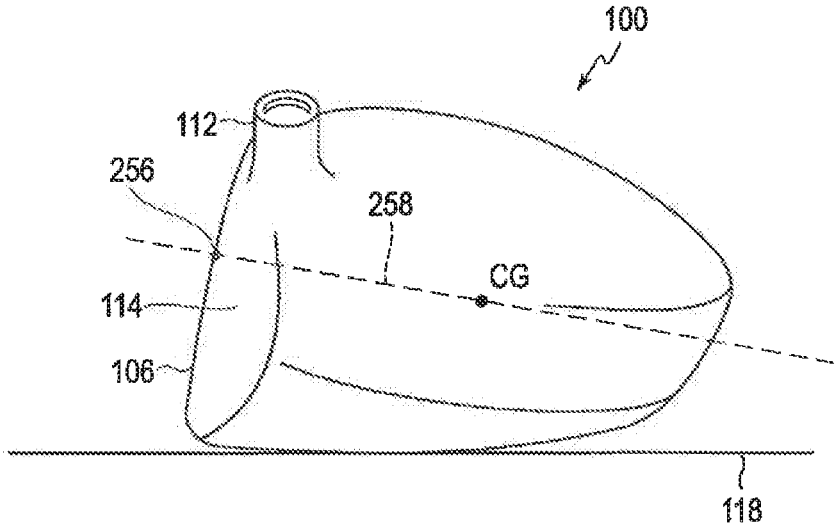
FIG. 18 is a heel-side elevational view of the golf club head of FIG. 1.

Referring to FIG. 18, "sweet spot", e.g., the sweet spot 256, as used herein, refers to the point of intersection between the front surface 114 and an imaginary line 258 that is substantially perpendicular to the front surface 114 and passes through the center of gravity CG of the club head 100.

Figure 19:
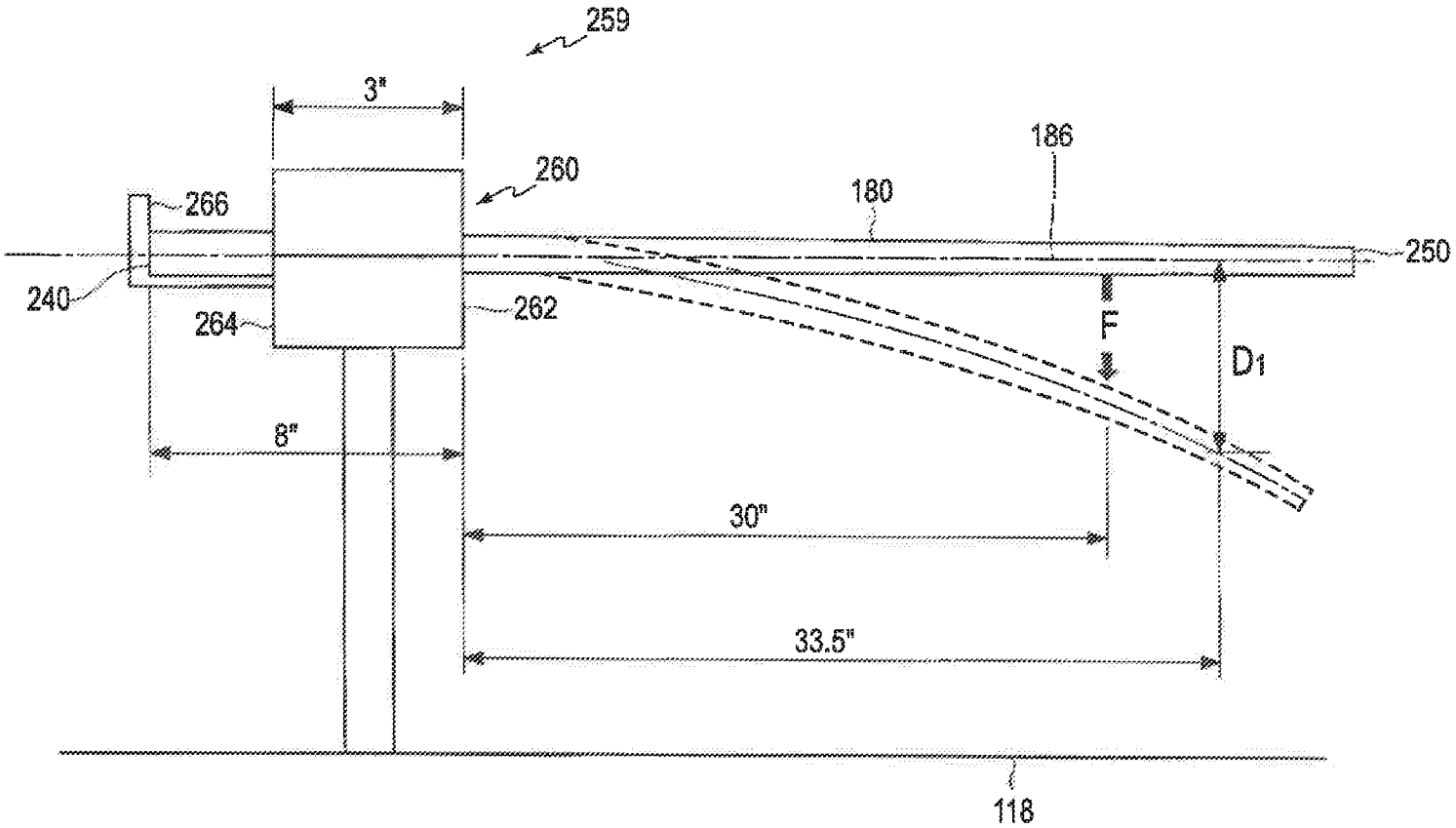
FIG. 19 schematically illustrates an apparatus for measuring the stiffness of an exemplary shaft in the butt region.

FIG. 19 schematically illustrates an apparatus 259 for measuring the bending stiffness of the shaft 180, with the shaft constrained at the butt region. The apparatus includes a shaft-butt clamp 260, having an anterior surface 262 and a posterior surface 264, laterally spaced a horizontal distance of 3 inches from the anterior surface 262, and a shaft-butt stop 266, laterally spaced a horizontal distance of 8 inches from the anterior surface 262 of the clamp 260. The shaft 180 is fixed in the clamp 260, whereby the butt end 240 of the shaft 180 abuts the stop 266 and the shaft axis 186 is substantially parallel to the ground plane 118. To measure the bending stiffness in the butt region of the shaft 180, the shaft is loaded with a mass of 2700 g, whereby a force F is applied to the shaft vertically downward at a horizontal distance of 30 inches from the anterior surface 262. The force F will displace the central axis of the shaft 180 downward from its neutral position. A deflection $D_1$, corresponding to the downward displacement of the shaft axis, is measured at a horizontal distance of 33.5 inches from the anterior surface 262 of the clamp 260 and is inversely proportional to the bending stiffness of the cantilever portion of the shaft 180.

Figure 20:
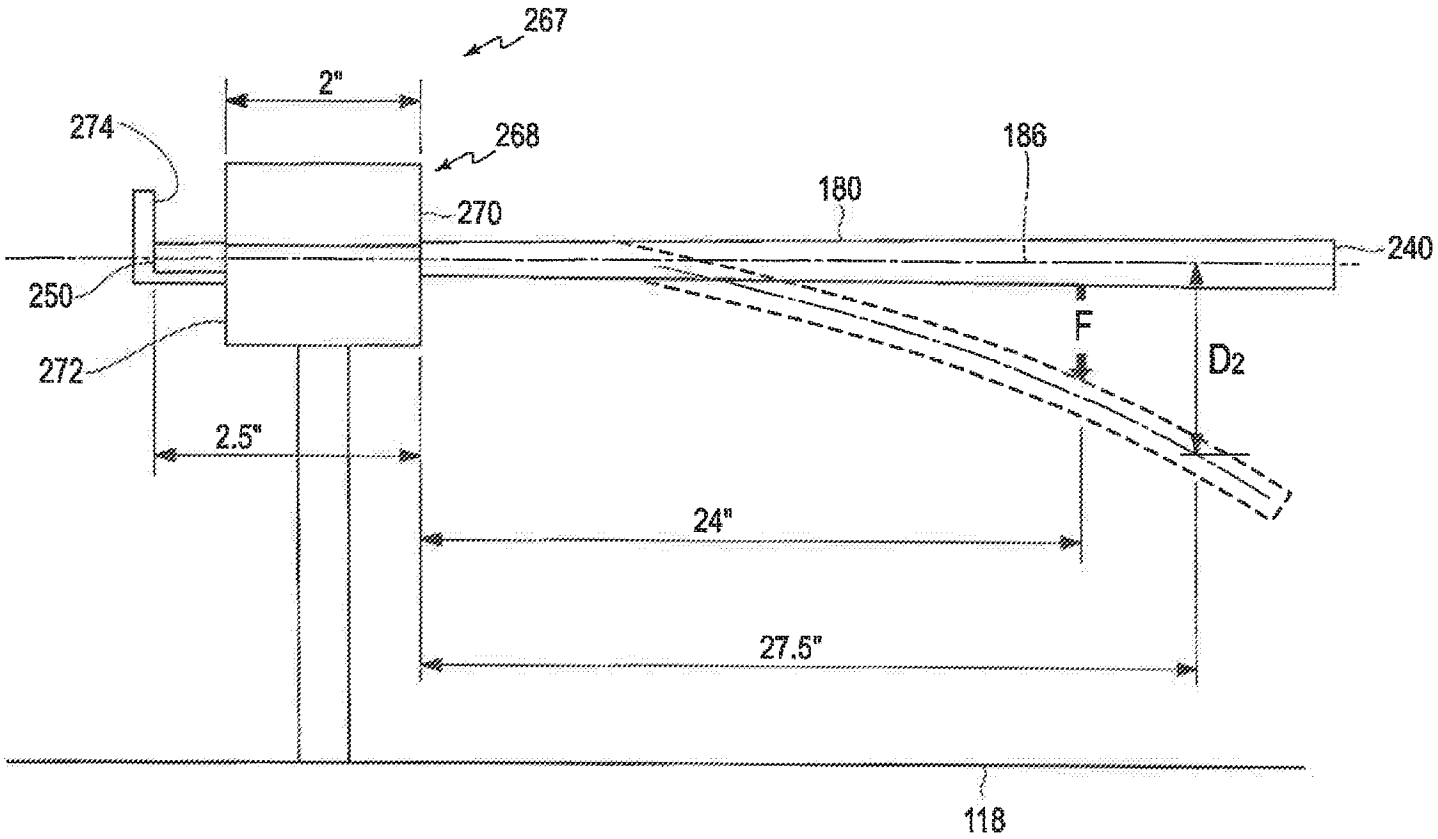
FIG. 20 schematically illustrates an apparatus for measuring the stiffness of an exemplary shaft in the tip region.

FIG. 20 schematically illustrates an apparatus 267 for measuring the bending stiffness of the shaft 180, with the shaft constrained at the tip region. The apparatus includes a shaft-tip clamp 268, having a front surface 270 and a rear surface 272, laterally spaced a horizontal distance of 2 inches from the front surface 270, and a shaft-tip stop 274, laterally spaced a horizontal distance of 2.5 inches from the front surface 270 of the clamp 268. The shaft 180 is fixed in the clamp 268, whereby the tip end 250 of the shaft 180 abuts the stop 274 and the shaft axis 186 is substantially parallel to the ground plane 118. To measure the bending stiffness in the tip region of the shaft 180, the shaft is loaded with a mass of 2700 g, whereby a force F is applied to the shaft vertically downward at a horizontal distance of 24 inches from the front surface 270. The force F will displace the central axis of the shaft 180 downward from its neutral position. A deflection $D_2$, corresponding to the downward displacement of the shaft axis, is measured at a horizontal distance of 27.5 inches from the front surface 270 of the clamp 268 and is inversely proportional to the bending stiffness of the cantilever portion of the shaft 180.

The bulge and roll of a driver club head may be measured using, e.g., the Radius Dial Gauge Type A, available from Chengdu Sharpfine Co., Ltd. of Chengdu, China. The bulge and roll of a fairway wood or hybrid club head may be measured using, e.g., the Golf Wood Club Face Radius Gauge, available from The Golfworks, Inc. of Newark, Ohio.

The swing weight of a golf club may be measured using, e.g., The Maltby Design® Golf Club Scale, available from The Golfworks, Inc. of Newark, Ohio.

The term "volume", as used herein, denotes the volume measured using the method described in the Procedure for Measuring the Club Head Size of Wood Clubs, Revision 1.0, Section 5 (Nov. 21, 2003), as specified by the United States Golf Association (USGA) and the R&A Rules Limited (R&A).

"Discretionary mass", as used herein, refers to the difference between the target mass of the club head and the minimum structural mass required to form the head.

Figure 21:
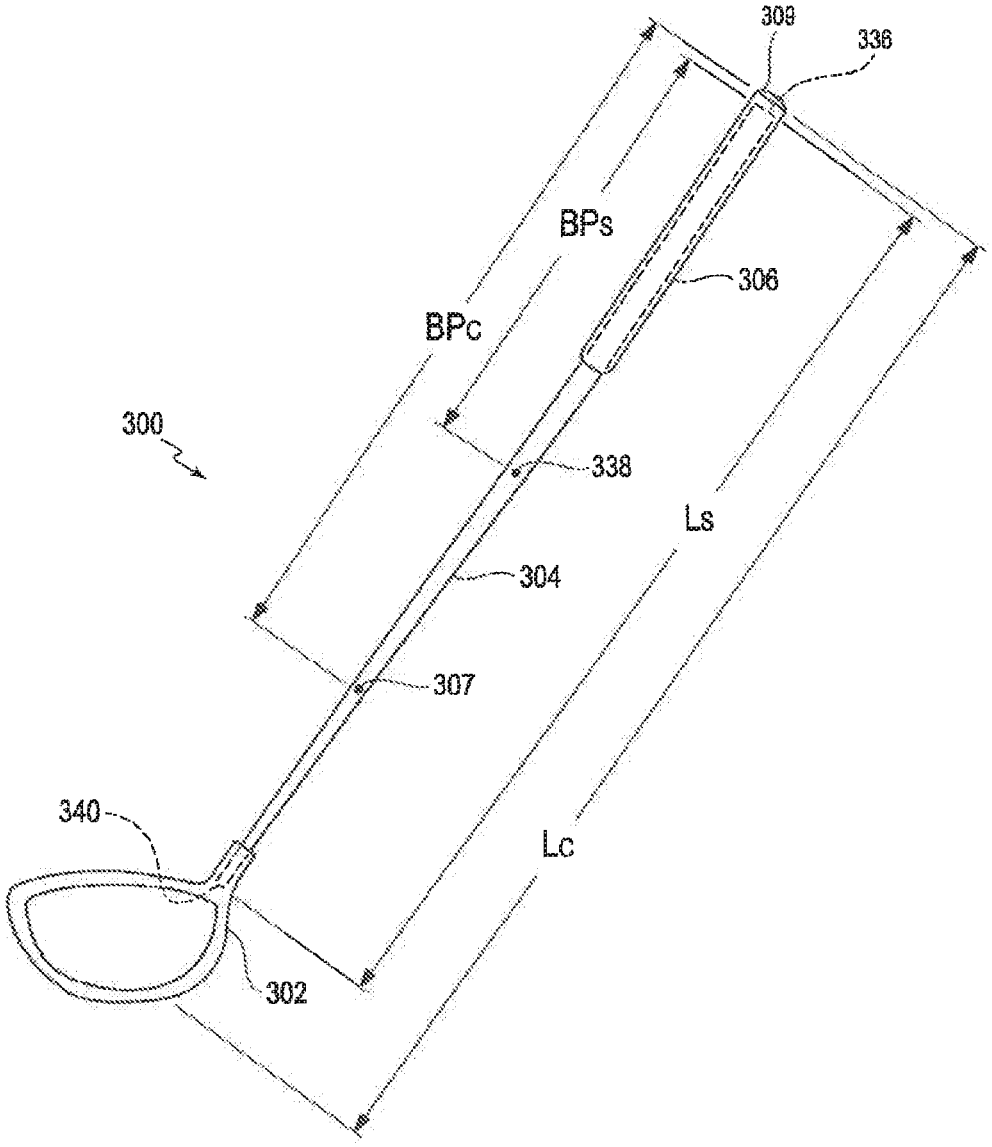
FIG. 21 is a front elevational view of an exemplary golf club, according to one or more aspects of the present invention.

Referring to FIG. 21, a golf club 300, according to one or more aspects of the present invention, includes a head 302, a shaft 304, having a tip end 340 and a butt end 336, and a grip 306, having a butt portion 309. The club 300 also includes a club balance point 307 and a shaft balance point 338. The golf club 300 has a light-weight construction wherein the total mass of the club is less than about 300 g, preferably less than 295 g, more preferably between about 285 g and about 295 g, and most preferably between about 250 g and about 285 g. The light-weight golf club 300 delivers a greater swing speed (i.e., club-head speed) and increased initial ball velocity, promoting extended travel distance of the golf ball. Since players are generally accustomed to a particular club swing weight, or weight distribution, about the club balance point 307, the swing weight of the light-weight golf club 300 is maintained within a range preferred by the player. Accordingly, the light-weight golf club 300 has a swing weight preferably between D0 and D8, more preferably between D0 and D6, and most preferably between D2 and D5. To maintain the swing weight of the club head 300 within the desired range, the club balance point 307 is preferably located a distance $BP_c$ of no more than 34 inches from the butt portion 309 of the grip 306 and more preferably no more than 35 inches from the butt portion 309. The golf club 300 may further comprise an overall club length $L_c$ of at least about 45 inches, preferably at least about 46 inches, and more preferably at least about 47 inches, to further increase the club head speed. The ratio of the club balance point distance $BP_c$ from the butt portion 309 to the overall club length $L_c$ may be greater than 0.76, preferably greater than 0.77, and more preferably greater than 0.78. The ratio of the club weight to the club balance point distance $BP_c$ from the butt portion 309 may be no more than 8.5, preferably no more than 8.4, and more preferably no more than 8.3.

Figure 22:
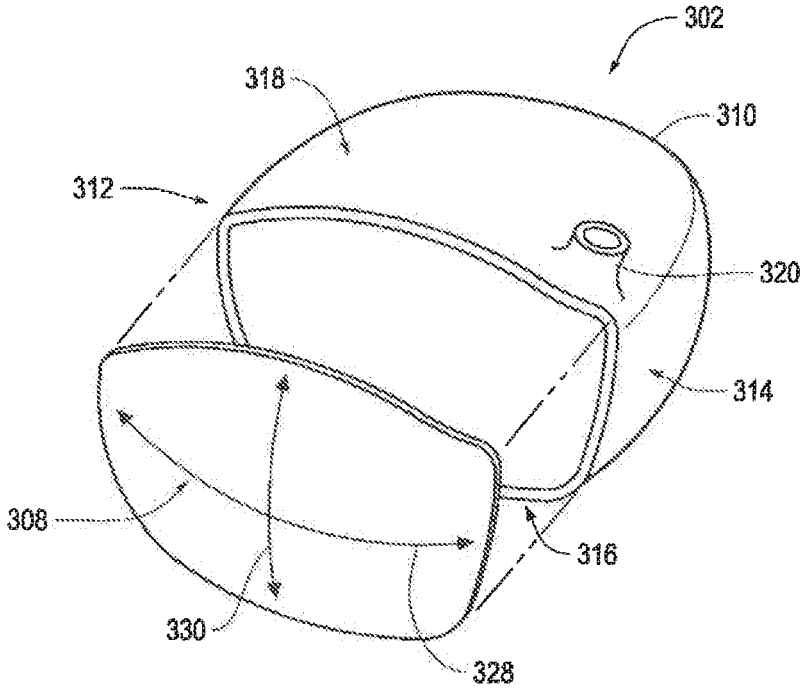
FIG. 22 is an exploded perspective view of an exemplary golf club head, according to one or more aspects of the present invention.

As shown in FIGS. 21 and 22, the golf club head 302, according to one or more aspects of the present invention, may comprise a front portion 308 and a club head body 310 having a toe 312, a heel 314, a bottom portion 316, a top portion 318, and a hosel 320. The front portion 308 may comprise a face plate 321 that is coupled to the club head body 310, e.g., by mechanical interlocking, welding, brazing, or adhesive bonding. The head body 310 and/or the front portion 308 may comprise a metallic and/or non-metallic material, e.g., stainless steel, titanium, or fiber-reinforced plastic. Preferably, the front portion 308 is formed from a different material than the head body 310. In other examples, the front portion 308 and the head body 310 may comprise the same material.

Figure 23:
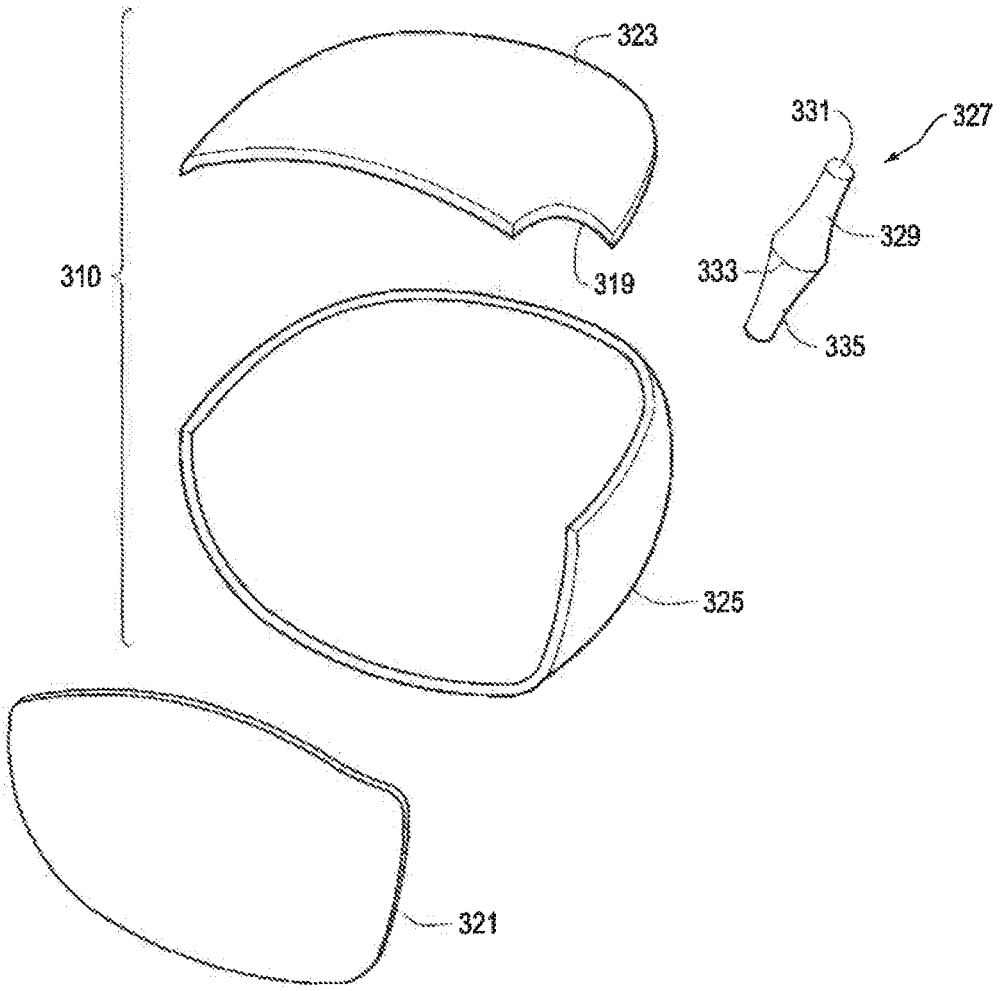
FIG. 23 is an exploded perspective view of an exemplary golf club head, according to one or more aspects of the present invention.

As illustrated in FIG. 23, the club head body 310 may have a multi-piece construction comprising a top plate 323, a bottom plate 325, and a hosel member 327. The top plate 323 may be coupled to the bottom plate 325, e.g., by mechanical interlocking, welding, or brazing. The top plate 323 may include a curved section 319, which constitutes a portion of a hosel opening (not shown), when the top plate 323 is coupled to the face plate 321 and the bottom plate 325. The hosel member 327 may comprise an upper portion 329, having a shaft opening 331 and a bottom lip 333, and a lower portion 335 to be entirely inserted into the hosel opening (not shown). The lower portion 335 may be coupled to the face plate 321, e.g., by mechanical interlocking, welding, brazing, or adhesive bonding. The bottom lip 333 of the hosel may be joined, e.g., by welding, brazing, mechanical interlocking, or adhesive bonding, to at least the top and bottom plate 323 and 325, and may also be optionally attached to the face plate 321. The face plate 321, the top plate 323, and the bottom plate 325 are preferably formed from metal sheet via a stamping operation to promote greater manufacturing efficiency, lower production costs, and a lighter club weight. Alternatively, the face plate 321, the top plate 323, and/or the bottom plate 325 may be formed via a forging and/or casting process. In another example, the top plate 323 may comprise a non-metallic material, such as fiber-reinforced plastic.

Preferably, the face plate 321 has a variable or constant thickness between about 2.00 mm and about 5.00 mm, more preferably, between about 2.25 mm and about 4.00 mm, and, most preferably, between about 2.50 mm and about 3.80 mm. The top plate 323 may have a thickness between about 0.25 mm and about 3.00 mm, preferably, between about 0.25 mm and about 2.00 mm, and, more preferably, between about 0.50 mm and about 1.00 mm. The bottom plate 325 may have a thickness between about 0.50 mm and about 3.00 mm, preferably, between about 0.50 mm and about 2.00 mm, and, more preferably, between about 0.50 mm and about 1.25 mm.

Figure 24A:
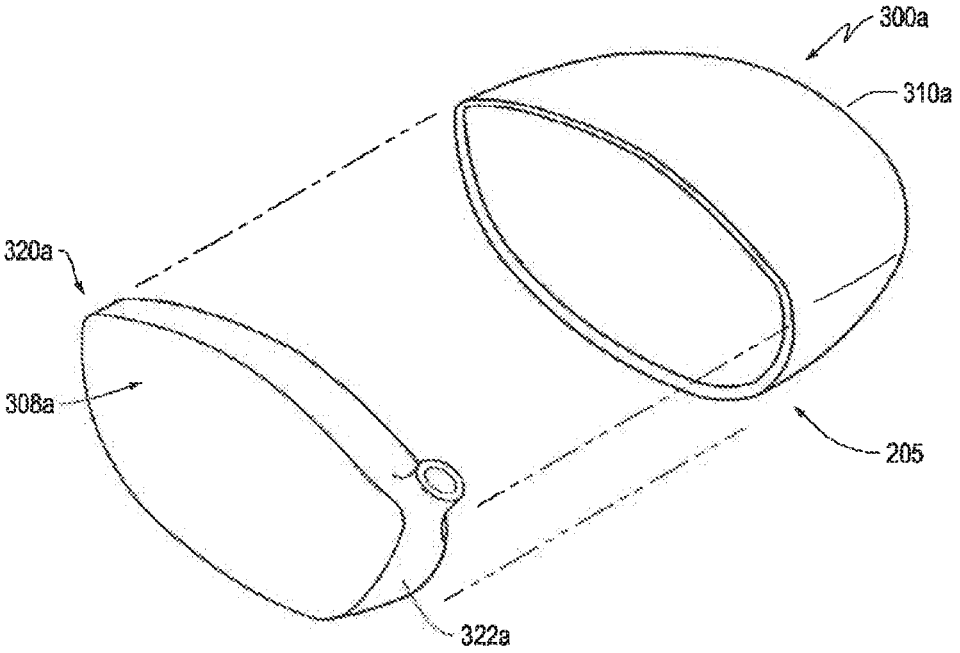
FIG. 24A is an exploded perspective view of an exemplary golf club head, according to one or more aspects of the present invention.
Figure 24B:
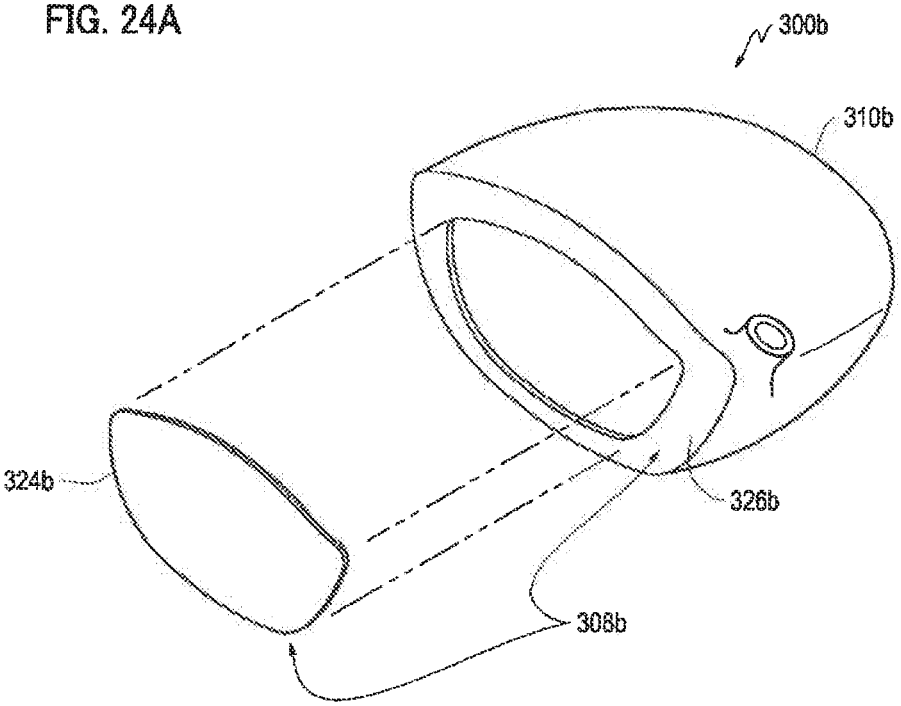
FIG. 24B is an exploded perspective view of an exemplary golf club head, according to one or more aspects of the present invention.

As shown in FIG. 24A, the golf club, according to one or more aspects of the invention, may include a club head 300a, having a cup-face portion 320a, which comprises a front portion 308a with an annular aft portion 322a, extending therefrom. The annular aft portion 322a may be integral with the front portion 308a and may be coupled to a club head body 310a via one of the joining methods described above. In another aspect of the present invention, illustrated in FIG. 24B, the golf club may include a club head 300b, comprising a front portion 308b, which has a face insert 324b and a peripheral portion 326b, integrally formed with a club head body 310b. The face insert 324b and the peripheral portion 326b may comprise the same or different materials. The face insert 324b may be coupled to the peripheral portion 326b via one of the joining methods discussed above.

Referring back to FIG. 21, the head of the golf club 300 preferably has a mass less than about 205 g, more preferably less than about 200 g, and most preferably between about 190 g and about 200 g. Decreasing the club head mass below 190 g unfavorably lowers the MOI and impact momentum of the club head, leading to a reduction in club-head forgiveness and ball travel distance. A high MOI improves club head performance on off-center hits by reducing slice/hook tendencies. Accordingly, the primary MOI of an exemplary club head may be at least about 4000 $g \cdot cm^2$, more preferably at least about 4500 $g \cdot cm^2$, and most preferably at least about 5000 $g \cdot cm^2$. The secondary MOI of the club head, according to one or more aspects of the present invention, may preferably be at least about 2500 $g \cdot cm^2$ and more preferably at least about 3000 $g \cdot cm^2$.

As illustrated in FIG. 22, to compensate for the undesirable spin characteristics ("gear effect") associated with off-center ball strikes, the front portion 308 of the exemplary club head 302 may include a bulge dimension 328 and a roll dimension 330. Since the club head 302 has a relatively large MOI, the front portion 308 may incorporate a bulge 328 and a roll 330 of a larger radius; to promote improved shot accuracy. For example, the bulge dimension 328 of the exemplary club head 302 may preferably have a radius of between about 11 inches and about 16 inches, and, more preferably, between about 13 inches and about 15 inches. Similarly, the roll dimension 330 of the exemplary club head 302 may preferably have a radii between about 9 inches and about 15 inches, and, more preferably, between about 11 inches and about 14 inches.

In one example, the club head according one or more aspects of the invention may have an overall width $W_o$ (see FIG. 13) and/or an overall length $L_o$ (see FIG. 12) of at least about 3 inches, preferably at least about 4 inches, more preferably at least about 5 inches, and most preferably at least about 5.5 inches. The volume of the club head 302 may be at least about 360 $cm^3$, preferably at least about 400 $cm^3$, more preferably at least about 430 $cm^3$, and most preferably at least about 450 $cm^3$.

Figure 25:
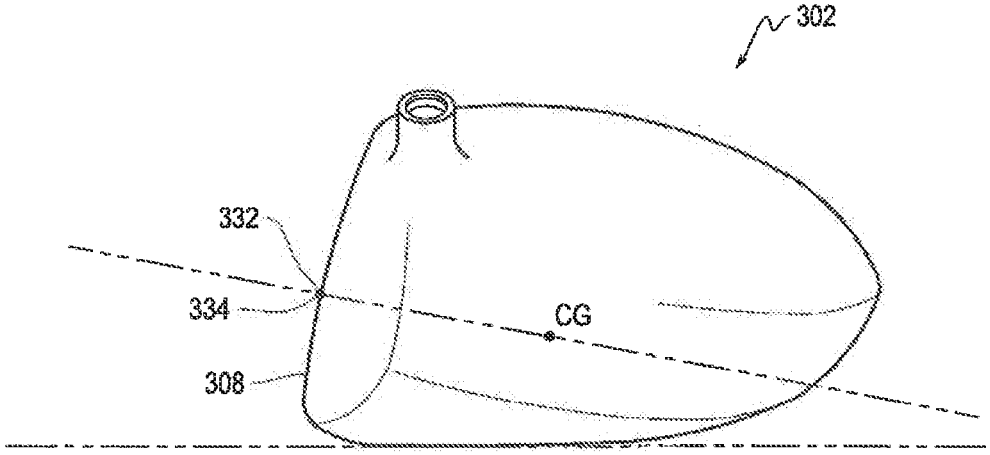
FIG. 25 is a heel-side elevational view of the golf club head of FIG. 22.

Referring to FIG. 25, the front portion 308 of the exemplary club head 302 includes a face center 332 and a sweet spot 334. Typically, the face center is located at or near a point on the front portion 308 where maximum face rebound and energy transfer occur at ball impact. The face center is also known as the Coefficient of Restitution (COR) "hot spot". The "Coefficient of Restitution" of the face center may be found using the general methodology disclosed in the Procedure for Measuring the Flexibility of a Golf Clubhead, Revision 2.0 (Mar. 25, 2005), as specified by the United States Golf Association (USGA). Preferably, the COR at the face center 332 is at least 0.81 and, more preferably, at least 0.82. The "sweet spot" is the point on the front portion of the club head where no head rotation occurs at ball impact. Since golfers have a natural tendency to strike the golf ball about the face center of the club head, the center of gravity CG of the club head 302 may be beneficially oriented so that the sweet spot 334 of the club head is substantially coincident with the face center 332. Accordingly, the benefits of increased shot distance, associated with striking the ball at the face center 332, and improved accuracy, associated with impacting the ball at the "sweet spot" 334, may be simultaneously realized.

In the light-weight golf club 300 (see FIG. 21), according to one or more aspects of the present invention, the mass of the shaft 304 is less than about 55 g, preferably less than about 50 g, more preferably less than about 40 g, and most preferably less than about 30 g. Those skilled in the art of golf-club making generally recognize that for the majority of players, the front portion (face) of the club head remains "open" at ball impact, resulting in a tendency to slice the ball. As mass is removed from the shaft 304, the torsional stiffness of the shaft is reduced, producing a club head that rapidly "closes" at ball impact. A face that is suddenly "closed" just prior to ball impact will increase ball speed, improve shot consistency, and create more draw bias (i.e., remove the fade or slice bias). To realize these benefits, the exemplary shaft 304 may have an torsional displacement angle of at least about 5°, preferably at least about 5.5°, more preferably at least about 6°, and most preferably between about 5° and about 7°.

A reduction in the torsional stiffness of a shaft may produce a golf club that communicates a vague feel to the player, causing inconsistent shots. Accordingly, the bending stiffness in the butt region of the shaft 304, in one or more aspects of the present invention, may be increased, relative to the bending stiffness in the tip region, to generate a more solid feel in the shaft region proximate the golfer's hands, thus promoting a tendency to create shaft loading that increases club-head speed and ball-launch angle at impact. One way to improve the bending stiffness in the butt region of the exemplary shaft 304 is to increase the outer diameter of the shaft in the butt region. In one example, a portion of the butt region may have a substantially constant outer diameter between about 0.63 inches and about 0.75 inches, preferably between about 0.65 inches and about 0.73 inches, and more preferably between about 0.65 inches and about 0.69 inches. Alternatively, the increased outer diameter of the butt region may gradually taper from the butt end 336 of the shaft 304 toward the tip. To improve feel even further, the deflection $D_1$ of the shaft (see FIG. 19), according to one or more aspects of the present invention, may preferably be between about 50 mm and about 100 mm, more preferably between about 60 mm and about 95 mm, and most preferably between about 70 mm and about 90 mm. The deflection $D_2$ of the shaft (see FIG. 20) is preferably between about 70 mm and about 150 mm, more preferably between about 80 mm and about 150 mm, and most preferably between about 90 mm and about 150 mm. The ratio of the deflection $D_2$ to the deflection $D_1$ is preferably at least about 1.46, more preferably at least about 1.48, and most preferably at least about 1.50.

The length $L_s$ of the shaft, according to one or more aspects of the present invention, is preferably at least about 42 inches, more preferably at least about 43 inches, and most preferably at least about 44 inches. The exemplary shaft 304 preferably has a shaft balance point 338 located a distance $BP_s$ (see FIG. 21) from the butt portion 309 of the grip that is no more than 24 inches, more preferably no more than 22 inches, and most preferably no more than 19 inches from the butt end 336 of the shaft 304. To maintain the club swing weight within the preferred range, the ratio of the shaft balance point distance $BP_s$ to the shaft length $L_s$ may be less than 0.47, more preferably less than 0.46, most preferably less than 0.45, and most preferably less than 0.44. The exemplary golf club may have a balance point value $((BP_c/L_c)/(BP_s/L_s))$ of at least about 1.68, preferably at least about 1.70, and more preferably at least about 1.72.

Referring once again to FIG. 21, the exemplary grip 306, according to one or more aspects of the present invention, comprises a mass less than 50 g, preferably less than 40 g, more preferably less than 30 g, and most preferably less than 25 g. A light-weight grip increases the swing weight of a golf club. Accordingly, to maintain the swing weight within a preferred range, about 3 g of mass may be removed from the grip for every 1 g of mass removed from the club head. The exemplary light-weight grip 306 further reduces the overall mass of the club head 300 to provide increased swing speed, while maintaining a preferred swing weight and solid feel of the golf club.

In the foregoing specification, the invention has been described with reference to specific exemplary aspects thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

[1. A golf club comprising:

a club head having a volume of greater than about 360 cm3 and a mass less than 200 g;

a shaft attachable to the club head having a tip end, a butt end, and a shaft balance point distance, BPs, as measured from the butt end, of no more than 19 inches; and a golf club mass less than 300 g;

an overall club length, Lc; and a club balance point distance, BPc, measured from the butt end of the shaft;

wherein a ratio (BPc/Lc) is no less than 0.76.]

[2. The golf club of claim 1, wherein the shaft further comprises a shaft length, Ls, no less than 44 inches.]

[3. The golf club of claim 1, wherein, respective to an imaginary coordinate system having an x-axis, a y-axis, a z-axis and an origin located at a center of gravity of the club head, the club head has a moment of inertia about the z-axis of at least about 4000 g-cm2.]

[4. The golf club of claim 3, wherein the MOI about the z-axis is about 4500 g-cm2.]

[5. The golf club of claim 1, wherein the mass of the golf club is less than 295 g.]

[6. The golf club of claim 1, wherein the mass of the golf club is between 285 g and 295 g.]

[7. The golf club of claim 1, wherein the overall club length, Lc, is no less than 45 inches.]

[8. The golf club of claim 1, wherein a ratio of the mass of the club head to the club balance point distance, BPc, is no greater than 8.5 grams/inch.]

[9. The golf club of claim 1, wherein the mass of the club head is between 190 g and 200 g.]

[10. The golf club of claim 1, further comprising a torsional displacement angle of greater than about 5.5°.]

*11. A golf club comprising:*

*a club head having a volume of greater than about 360 cc and a mass less than 200 g;*

*a shaft attachable to the club head, the shaft having a tip end, a butt end, a shaft mass less than 40 g, and a shaft balance point distance, BPs, as measured from the butt end, of no greater than 24 inches;*

*a golf club mass less than 300 g;*

*an overall club length, Lc, of no less than 45 in;*

*a shaft length, Ls; and*

*a club balance point distance, BPc, measured from the butt end of the shaft,*

*wherein a ratio (BPc/Lc)/(BPs/Ls) is at least about 1.68.*

*12. The golf club of claim 11, wherein the shaft mass is less than 30 g.*

*13. The golf club of claim 11, wherein the club head comprises a fiber-reinforced plastic.*

*14. The golf club of claim 13, wherein the club head comprises a main body and a striking face coupled to the main body, the main body including a top plate comprising a fiber-reinforced material.*

*15. The golf club of claim 11, wherein the shaft balance point distance, BPs, is no greater than 19 inches.*

*16. The golf club of claim 11, wherein the shaft length, Ls, is no less than 44 inches.*

*17. The golf club of claim 11, wherein, respective to an imaginary coordinate system having an x-axis, a y-axis, a z-axis, and an origin located at a center of gravity of the club head, the club head has a moment of inertia about the z-axis (Izz) of at least about 4000 g-cm$^2$.*

*18. The golf club of claim 11, wherein the mass of the golf club is less than 295 g.*

*19. The golf club of claim 11, wherein the mass of the golf club is between 285 g and 295 g.*

*20. The golf club of claim 11, wherein the mass of the club head is between 190 g and 200 g.*

*21. A golf club comprising:*

*a club head comprising a volume of greater than about 360 cc and a mass less than 200 g, the club head including a fiber-reinforced plastic material;*

*a shaft attachable to the club head, the shaft having a tip end, a butt end, a shaft mass less than 40 g, and a shaft balance point distance, BPs, as measured from the butt end, of no greater than 24 inches;*

*a golf club mass less than 300 g;*

*an overall club length, Lc, of no less than 45 in;*

*a shaft length, Ls; and*

*a club balance point distance, BPc, measured from the butt end of the shaft,*

*wherein a ratio (BPc/Lc)/(BPs/Ls) is at least about 1.68.*

*22. The golf club of claim 21, wherein the club head comprises a main body and a striking face coupled to the main body, the main body including a top plate comprising a fiber-reinforced material.*

*23. The golf club of claim 21, wherein the shaft balance point distance, BPs, is no greater than 19 inches.*

*24. The golf club of claim 21, wherein the shaft length, Ls, is no less than 44 inches.*

*25. The golf club of claim 21, wherein, respective to an imaginary coordinate system having an x-axis, a y-axis, a z-axis, and an origin located at a center of gravity of the club head, the club head has a moment of inertia about the z-axis (Izz) of at least about 4000 g-cm$^2$.*

*26. The golf club of claim 21, wherein the mass of the golf club is less than 295 g.*

*27. The golf club of claim 26, wherein the mass of the golf club is between 285 g and 295 g.*

*28. The golf club of claim 21, wherein the mass of the club head is between 190 g and 200 g.*

* * * * *